July 3, 1956  A. Y. DODGE  2,753,028
ONE WAY CLUTCHES
Filed July 28, 1952

INVENTOR:
Adiel Y. Dodge,
BY
Bair, Freeman & Molinare
ATTORNEYS.

United States Patent Office 2,753,028
Patented July 3, 1956

2,753,028

ONE WAY CLUTCHES

Adiel Y. Dodge, Rockford, Ill., assignor to Borg-Warner Corporation, Chicago, Ill., a corporation of Illinois Application July 28, 1952, Serial No. 301,235

6 Claims. (Cl. 192—45.1)

This invention relates to one way clutches and more particularly to the control of the grippers in a tilting gripper type clutch.

In tilting gripper type clutches as heretofore proposed, the control of tilting of the grippers for engaging and disengaging the races has been effected by utilizing one or more cage rings frictionally engaging the races to be turned thereby. Such cage rings engage the grippers toward their ends and tend to tilt them rapidly and uniformly upon torque reversal.

In such construction the cage tends to become relatively complicated and expensive due to the necessity of providing for frictional engagement thereof with the races. Furthermore, with such construction, the amount of frictional drag between the cage elements and the races cannot readily be adjusted to accommodate different operating conditions.

It is one of the objects of the present invention to provide a one way clutch in which the cage is controlled by auxiliary friction members loosely inserted therein in the same manner as the grippers and frictionally engaging the races.

According to one feature, the auxiliary friction members are of the same size and generally similar in shape to the grippers and constitute a series of dummy grippers to be used in any desired number in place of the working grippers. In this way the friction effect can easily be changed by changing the number of dummy grippers employed in the assembly.

According to another feature the dummy grippers are formed in two parts respectively urged into frictional engagement with the races by springs. In the preferred construction, one of the parts is in the form of a channel shaped strip and the other part fits slidably in the channel shaped strip and is urged outwardly thereof by spring means. Preferably interengaging parts are provided on the dummy grippers to limit relative movement thereof and to prevent complete separation.

The above and other objects and features of the invention will be more readily apparent from the following description when read in connection with the accompanying drawings in which.

Figure 1:
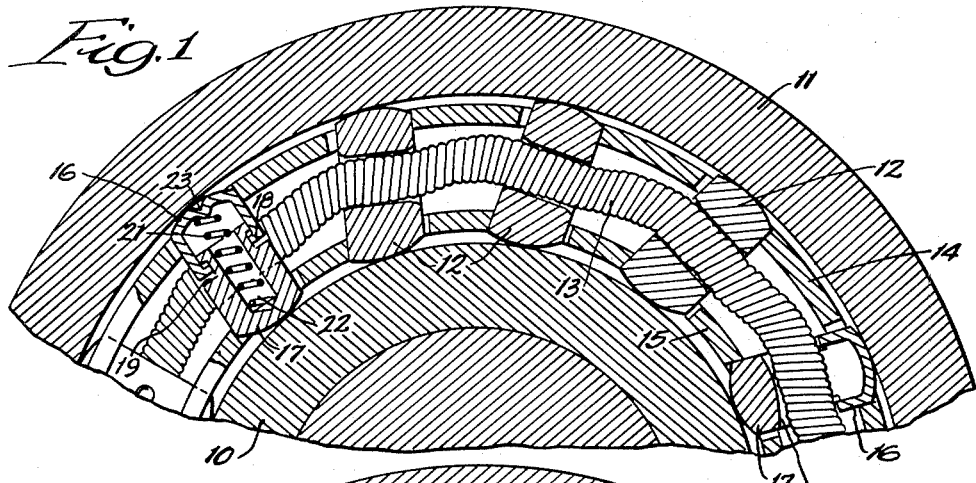
Figure 1 is a partial transverse section through a clutch embodying the invention.

The clutch as shown in Figure 1 is adapted to connect an inner race 10 having an outer cylindrical surface to an outer race 11 having an inner cylindrical surface coaxial with and separated from the surface of the race 10. A series of tilting grippers 12 are mounted in annular array between the race surfaces and having their ends curved about spaced centers so that when they are tilted in one direction they will grip the race surfaces to connect the races and when they are tilted in the opposite direction they will release the races. As shown, an annular spring 13 is threaded through openings in the grippers 12 and tends to tilt them counterclockwise toward their engaging positions.

The grippers are held properly spaced apart and are controlled by a cage construction including an outer annular cage ring 14 of a diameter such that it will lie adjacent to and may engage and be centered by the outer race and formed with spaced openings therein through which the outer ends of the grippers project. An inner cage ring 15 is of a diameter such that it will lie adjacent to the inner race and is formed with a similar series of openings through which the inner ends of the grippers project. Preferably the openings in the cage rings receive the grippers with a relatively small clearance so that the grippers are forced to tilt simultaneously but have a limited degree of movement relative to the cage rings to accommodate for irregularities.

Tilting of the grippers is controlled partially by the spring 13 and partially by relative movement of the inner and outer cage rings to disengage and engage the grippers rapidly and uniformly upon reversals of torque between the races. For this purpose, according to the present invention, a series of dummy grippers are employed to replace certain of the working grippers and which frictionally engage the races to turn the cage rings in response to the relative rotation of the races. Preferably at least three dummy grippers are employed in an assembly and more dummy grippers may be used where a greater frictional effect is desired.

Figures 4, 5:
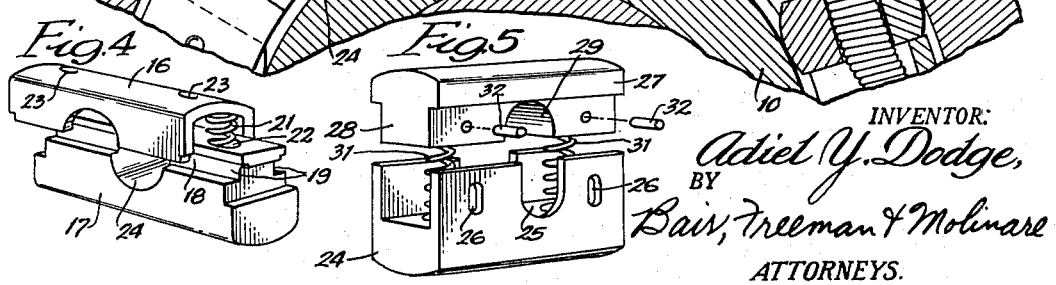
Figure 4 is a partially disassembled perspective view of a dummy gripper.
Figure 5 is a view similar to Figure 4 of an alternative gripper construction.

Each of the dummy grippers, as shown in Figures 1 and 4, is formed by a channel shaped strip 16 having an arcuate curved outer end and opening radially inward. A second strip 17, which may be formed in any desired manner as by extruding or die casting, is provided to fit into the channel shaped strip 16 and has an arcuate curved outer end to fit against the inner race 10. To hold the strips together the edges of the channel strip are preferably bent inward as indicated in 18 to define flanges fitting into grooves 19 in the sides of the strips 17. The grooves 19 are wider than the flanges 18 so that the strips can have a limited amount of movement relative to each other. Springs 21 mounted in the channel shaped strips urge the strips apart and into frictional engagement with the race surface respectively. The springs are anchored by fitting them into openings 22 in the strip 17 and by providing pressed out projections 23 in the strip 16 over which the springs can seat. The strips 16 and 17 are formed with cut out portions 24 therein to provide openings through the dummy grippers through which the annular spring 13 can extend loosely.

With the parts assembled as shown in Figure 1, the opposite ends of the dummy grippers will be urged apart by the springs 21 to frictionally engage the respective race surfaces so that the dummy grippers tend to tilt in response to the direction of relative rotation of the races. With the outer race 11 turning clockwise, the dummy grippers will move the outer cage ring 14 clockwise relative to the inner cage ring 15 and will tilt all of the working grippers 12 clockwise to release the races. At this time the races can overrun freely relative to each other. The working grippers may actually be out of engagement with one or both of the races during overrunning but the dummy grippers will still engage both races due to separation of their end portions by the springs 21. Upon a torque reversal, the dummy grippers will be tilted immediately due to their frictional engagement with the races to engage the cage rings and move the outer ring 14 counterclockwise relative to the inner ring to allow all of the grippers to tilt simultaneously and rapidly to their engaged position. It will be noted that the cage rings 14 and 15 can be very simple and inexpensive annular strips of sheet material and that control thereof is effected through the dummy grippers without requiring that the rings themselves frictionally engage the races. The dummy grippers are squeezed radially against the springs 21 at this time so that they maintain contact with the races but do not normally act as torque transmitting elements.

Figure 2:
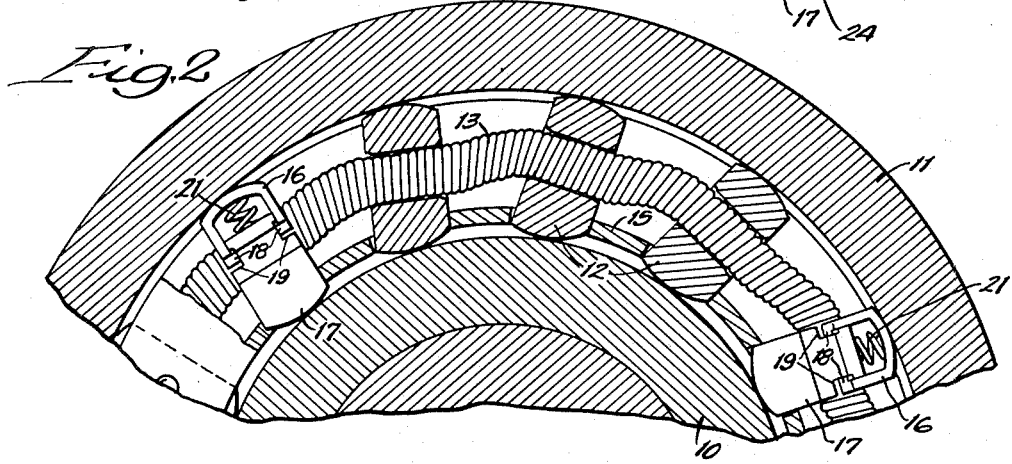
Figure 2 is a similar view showing an alternative cage arrangement.

In the embodiment, shown in Figure 2, the outer cage ring is omitted and only the inner cage ring is employed. Parts in this figure corresponding to identical parts in Figure 1 are indicated by the same reference numerals for brevity of description. In operation, the inner ring 15 is turned by the dummy grippers through frictional engagement thereof with the races and frictional engagement of the outer ends of the grippers themselves with the outer race due to the effect of centrifugal force on the grippers is relied upon in place of the outer cage 14. This construction functions in substantially the same manner as that of Figure 1 with the one exception noted above.

Figure 3:
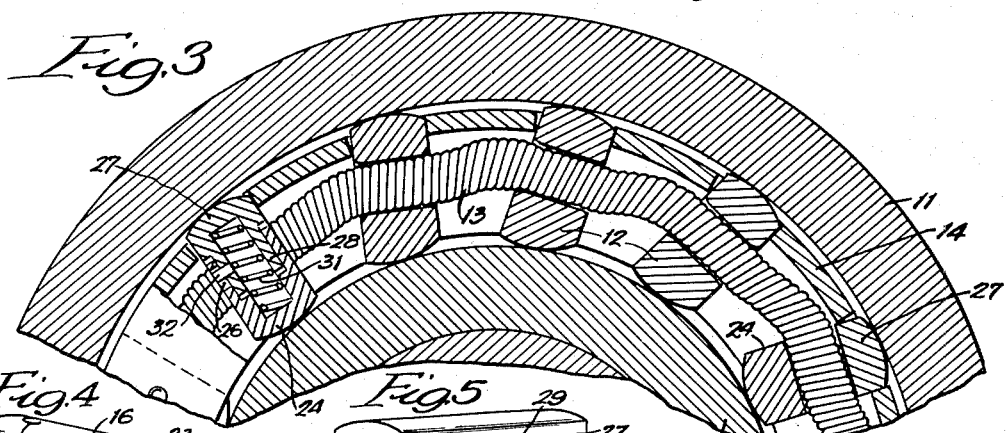
Figure 3 is a similar view showing still another alternative cage arrangement.

In the embodiment of Figure 3, wherein parts identical with the like parts in Figure 1 are indicated by the same reference numerals, the inner cage ring 15 is omitted and control of the grippers is effected solely through the outer cage ring 14. This construction also functions in substantially the same manner as that of Figure 1 and is preferred for certain installations where reversals of torque are less rapid and severe, and where cost is an important factor.

Figures 3 and 5 also illustrate an alternative construction of the dummy grippers including an inner channel shaped member 24 with its channel opening outward and having an arcuate inner end to engage the inner race. The sides of the channel are cut away as indicated at 25 to provide openings for the spring 13 and radially elongated slots 26 are formed therein. These elements may be formed from extruded stripping, by die casting, or in any other desired manner.

A second elongated strip 27, also formed by extruding, die casting, or the like, has a narrow body portion 28 to fit slidably in the open channel 24 and may be cut out as indicated in 29 to receive the annular spring 13. Springs 31 fitting between the strips urge them apart and into frictional engagement with the races and pins 32 carried by the strip 27 extend through the slots 26 to limit relative separation of the strips when they are not assembled between the races. These dummy grippers function in exactly the same way as the dummy grippers shown in Figures 1 and 3, the only difference being in the manner of manufacture and assembly.

With the present construction the spring 13 can be made relatively heavy and stiff to urge the grippers rapidly and firmly into engagement with the races without producing wear on the grippers. This is because the friction members, acting through the cage rings, will tilt the grippers out of engagement with the races during overrunning so that what wear occurs is on the friction members where it is not seriously objectionable.

While several embodiments of the invention have been shown and described in detail, it will be understood that these are illustrative only and not to be taken as a definition of the scope of the invention, reference being had for this purpose to the appended claims.

What is claimed is:

1. A one-way clutch for connecting coaxial cylindrical races comprising a pair of relatively rotatable cage means fitting between the races and formed with means defining a series of spaced openings therethrough, a series of tiltable grippers fitting loosely in the majority of the openings and having eccentrically curved ends engageable with the races, the cage means holding the grippers spaced apart and assisting in the control of tilting thereof, and dummy grippers in other cage openings circumferentially dimensioned to fit sufficiently loosely in said other openings in the cage means to tilt relative to said cage means, each of the dummy grippers including a pair of end parts interfitting for relative movement radially of the races and having curved ends frictionally in contact with both the races, and means urging said parts away from each other and into simultaneous engagement with both the races.

2. The construction of claim 1 in which said cage means comprises a pair of relatively rotatable annular rings, one lying adjacent to the inner race and the other lying adjacent to the outer race.

3. A one-way clutch for connecting coaxial cylindrical races comprising a pair of relatively rotatable cage means fitting between the races and formed with means defining a series of spaced openings therethrough, a series of tiltable grippers fitting loosely in the majority of the openings and having eccentrically curved ends engageable with the races, the grippers having side surfaces adapted to engage the cage means at the edges of the openings, and dummy grippers in other cage openings circumferentially dimensioned to fit sufficiently loosely in said other openings in the cage means to tilt relative to said cage means, each of the dummy grippers including a pair of end parts interfitting for relative movement radially of the races and defining a body with side surfaces constructed and arranged to engage the edges of said openings and constructed with curved ends frictionally in contact with both the races and further constructed of substantially the same size and general shape as the grippers, and spring means between the parts urging them away from each other and simultaneously into engagement with both the races.

4. A one-way clutch for connecting coaxial cylindrical races comprising a pair of relatively rotatable cage means fitting between the races and formed with means defining a series of spaced openings therethrough, a series of tiltable grippers fitting loosely in the majority of the openings and having eccentrically curved ends engageable with the races, the grippers having flat parallel sides engaging the cage means at the edges of the openings, and dummy grippers in other cage openings circumferentially dimensioned to fit sufficiently loosely in other openings in the cage means to tilt relative to said cage means, each of the dummy grippers including a channel shaped strip having a curved outer end to engage one of the races, a second strip fitting slidably in the channel shaped strip and formed with a curved outer end to engage the other of the races, spring means in the channel shaped strip urging the strips apart whereby said strips simultaneously engage both races, and interengaging parts on the strips to limit relative separation thereof.

5. A one-way clutch for connecting coaxial cylindrical races comprising a pair of relatively rotatable cage means fitting between the races and formed with means defining a series of spaced openings therethrough, a series of tiltable grippers fitting loosely in the majority of the openings and having eccentrically curved ends engageable with the races, the grippers having flat parallel sides engaging the cage means at the edges of the openings, and dummy grippers in other openings in said cage means circumferentially dimensioned to fit sufficiently loosely in said other openings in the cage means to tilt relative to said cage means, each of the dummy grippers including a channel shaped strip having a curved outer end to engage one of the races, a second strip fitting slidably in the channel shaped strip and formed with a curved outer end to engage the other of the races, spring means in the channel shaped strip urging the strips apart whereby said strips simultaneously engage both races, the second strip having means defining grooves in its sides wider than the thickness of the channel shaped strip sides, and inturned flanges at the edges of the channel sides fitting into the grooves to limit separation of the strips.

6. In a one-way clutch for connecting a pair of races, the combination comprising a pair of annular cages disposed between said races, means defining a plurality of spaced openings in said cages, a plurality of tiltable grippers respectively extending through certain of said openings in both cages, means defining opposite end surfaces on each of said grippers curved about spaced centers adapted to wedgingly engage between the races to effect their connection during one direction of relative rotation thereof and permit opposite relative rotation of the races, a plurality of dummy grippers respectively extending through other of said openings in both cages constructed and arranged to be rotatable relative to said cages; each of said dummy grippers comprising first and second parts relatively movable with respect to each other, means defining curved race engaging surfaces on each part having a greater degree of curvature than the race surface engaged thereby, and spring means biasing said first and second parts away from each other into constant engagement with both of said races whereby said dummy grippers tilt during predetermined conditions of said clutch and effect relative rotation between said pair of annular cages.

References Cited in the file of this patent
UNITED STATES PATENTS

| | | |
|---|---|---|
| 2,386,013 | Swenson | Oct. 2, 1945 |
| 2,404,221 | Dodge | July 16, 1946 |
| 2,609,904 | Swenson | Sept. 9, 1952 |